US012025939B2

(12) United States Patent
Takahashi

(10) Patent No.: US 12,025,939 B2
(45) Date of Patent: Jul. 2, 2024

(54) IMAGE FORMING APPARATUS HAVING A TOP COVER WITH AN OVERHANG PORTION

(71) Applicant: KYOCERA Document Solutions Inc., Osaka (JP)

(72) Inventor: Hironori Takahashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/587,846

(22) Filed: Jan. 28, 2022

(65) Prior Publication Data

US 2022/0244672 A1 Aug. 4, 2022

(30) Foreign Application Priority Data

Feb. 3, 2021 (JP) ................................ 2021-015487

(51) Int. Cl.
*G03G 15/00* (2006.01)

(52) U.S. Cl.
CPC ................................ *G03G 15/6552* (2013.01)

(58) Field of Classification Search
CPC ............ G03G 15/6552; B65H 2402/40; B65H 2402/44; B65H 2405/10; B65H 2405/11; B65H 2405/20; B65H 31/26
See application file for complete search history.

(56) References Cited

U.S. PATENT DOCUMENTS 6,295,437 B1 9/2001 Hodoshima et al. ......... 399/346
8,594,556 B2 * 11/2013 Ito ...................... G03G 15/6552 271/220
2007/0147888 A1 6/2007 Igarashi et al. ............... 399/119
2011/0097109 A1 4/2011 Igarashi et al. ............... 399/119
2012/0076536 A1 3/2012 Igarashi et al. ............... 399/119
2013/0188990 A1 7/2013 Igarashi et al. ............... 399/119
2014/0334849 A1 11/2014 Igarashi et al. ............... 399/262
2017/0355541 A1 * 12/2017 Koyama ................ B65H 29/52
2020/0002116 A1 * 1/2020 Mizuguchi ......... G03G 15/6552
2021/0165356 A1 * 6/2021 Hatakeyama ...... G03G 15/6579

FOREIGN PATENT DOCUMENTS

JP 2000-194192 A 7/2000
JP 2007/199652 A 8/2007

* cited by examiner

*Primary Examiner* — Jennifer Bahls
*Assistant Examiner* — Quang X Nguyen
(74) *Attorney, Agent, or Firm* — Stein IP, LLC

(57) ABSTRACT

An image forming apparatus includes a sheet conveyance passage, an image forming apparatus, a sheet discharge unit, an apparatus body, a sheet discharge port, a pair of sheet pressing members, a discharge tray, and an overhang portion. The image forming unit includes an image carrying member. The sheet discharge unit is disposed above the image forming unit. The sheet discharge port is provided in the sheet discharge unit and has an upper edge and a lower edge. The pair of sheet pressing members press the sheet passing through the sheet discharge port. The overhang portion protrudes from the upper edge of the sheet discharge port in the sheet discharge direction beyond the lower edge. The overhang portion is disposed such that the straight line passing through the distal end of the overhang portion and the lower edge of the sheet discharge port passes above the image carrying member.

6 Claims, 4 Drawing Sheets

IMAGE FORMING APPARATUS HAVING A TOP COVER WITH AN OVERHANG PORTION

INCORPORATION BY REFERENCE

This application is based on and claims the benefit of priority from Japanese Patent Application No. 2021-15487 filed on Feb. 3, 2021, the contents of which are hereby incorporated by reference.

BACKGROUND

The present disclosure relates to image forming apparatuses such as copiers, printers, and facsimile machines. More particularly, the present disclosure relates to image forming apparatuses provided with a sheet discharge port through which sheets having images formed on them are discharged onto a discharge tray.

In an image forming apparatus such as a copier, printer, or facsimile machine or a multifunction peripheral incorporating their functions, when image forming operation is performed, a photosensitive drum (image carrying member) is electrostatically charged uniformly by a charging device, an electrostatic latent image is formed on the photosensitive drum with a laser beam based on document image data from an exposure device (such as a laser scanning unit), and developer (toner) is attached to the electrostatic latent image by a developing device to form a toner image. The toner image is transferred to a sheet (recording medium) in a transfer unit and is then heated and pressed in a fixing unit so as to be fixed to the sheet. The sheet having the image fixed to it is discharged through a sheet discharge port out of the apparatus.

SUMMARY

According to a first aspect of the present disclosure, an image forming apparatus includes a sheet conveyance passage, an image forming unit, a sheet discharge unit, an apparatus body, a sheet discharge port, a pair of sheet pressing members, a discharge tray, and an overhang portion. The image forming unit includes an image carrying member having a photosensitive layer formed on its surface, and electrophotographically forms an image on a sheet conveyed along the sheet conveyance passage. The sheet discharge unit is disposed above the image forming unit, and discharges the sheet having the image formed on it in the image forming unit. In the apparatus body, the sheet conveyance unit, the image forming unit, and the sheet discharge unit are included. The sheet discharge port is provided in the sheet discharge unit in the apparatus body, and has an upper edge and a lower edge extending in the width direction orthogonal to the sheet conveyance direction. The pair of sheet pressing members are provided at both ends of the sheet discharge port in the sheet width direction so as to extend obliquely downward, toward the downstream side in the sheet discharge direction, and press both ends of the sheet passing through the sheet discharge port. On the discharge tray, the sheet discharged through the sheet discharge port is stacked. The overhang portion protrudes from the upper edge of the sheet discharge port in the sheet discharge direction beyond the lower edge of the sheet discharge port. The overhang portion is disposed such that the straight line passing through the distal end of the overhang portion and the lower edge of the sheet discharge port passes above the image carrying member inside the apparatus body.

DETAILED DESCRIPTION

Figure 1:
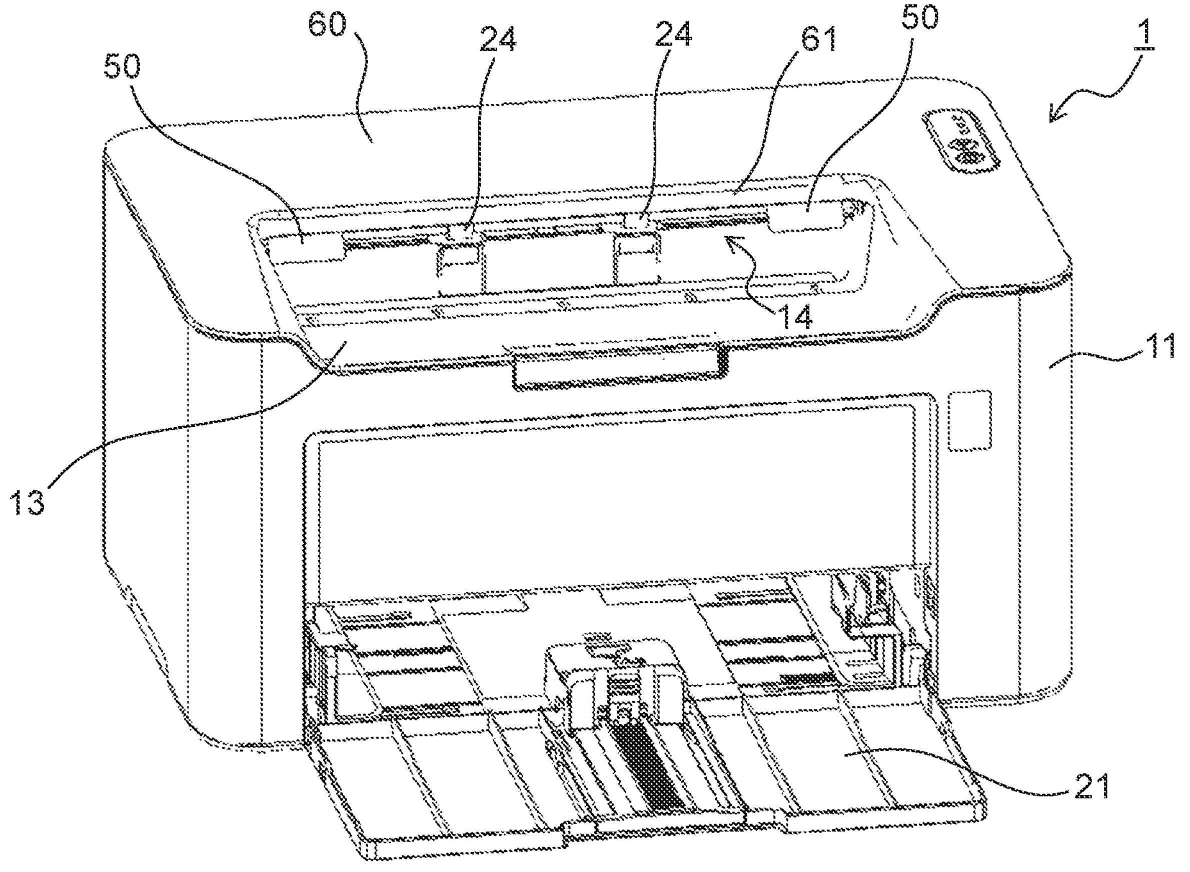
FIG. 1 is an exterior perspective view of an image forming apparatus according to one embodiment of the present disclosure, as seen from in front.
Figure 2:
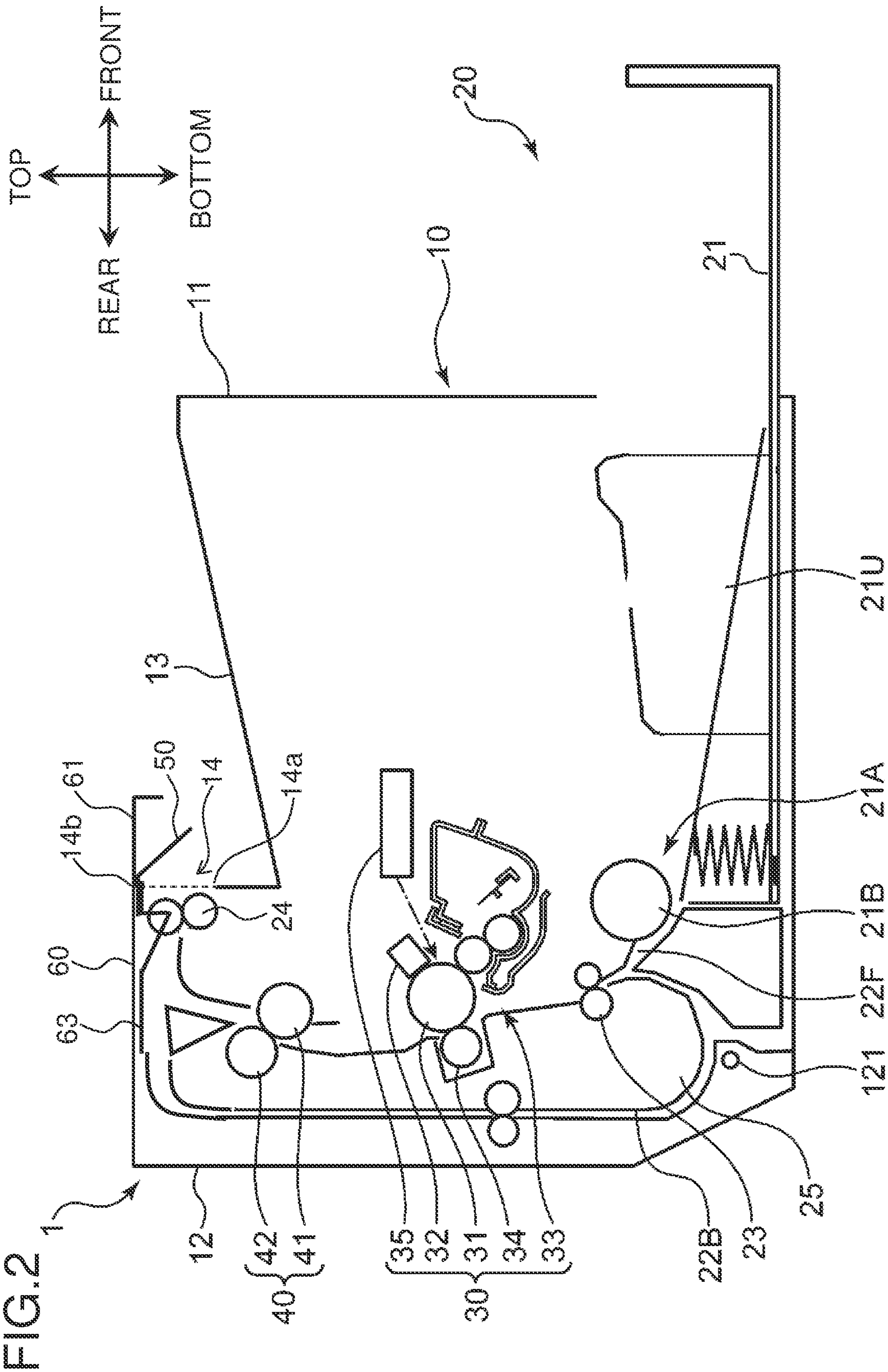
FIG. 2 is a sectional side view of the image forming apparatus according to the embodiment, showing its construction in outline.

An embodiment of the present disclosure will be described below with reference to the accompanying drawings. FIG. 1 is an exterior perspective view of an image forming apparatus 1 according to one embodiment of the present disclosure, as seen from in front (from the right side in FIG. 2). FIG. 2 is a sectional side view of the image forming apparatus 1 according to the embodiment, showing its construction in outline.

The image forming apparatus 1 (here, a monochrome printer) includes a body housing 10 (apparatus body) having a housing structure substantially in the shape of a rectangular parallelepiped, and includes, housed inside the body housing 10, a sheet feeding unit 20, an image forming unit 30, and a fixing unit 40. The body housing 10 has, on its front face, a front cover 11 and, on its rear face, a rear cover 12. With the rear cover 12 opened, the image forming unit 30 and the fixing unit 40 can be mounted in and dismounted out of the body housing 10 at the rear side of the body housing 10. The body housing 10 has, in its top face, a discharge tray 13 onto which sheets having undergone image formation are discharged.

The sheet feeding unit 20 includes a sheet feed cassette 21 in which sheets to be subjected to image forming operation are stored. A part of the sheet feed cassette 21 protrudes frontward beyond the front face of the body housing 10. The sheet feed cassette 21 has a sheet storage space, in which a bundle of sheets is stored and a lift plate 21U for lifting up the sheets for sheet feeding is provided. Over a rear part of the sheet feed cassette 21, a sheet feeder 21A is provided. In the sheet feeder 21A, a sheet feed roller 21B is disposed for feeding one sheet after another from the topmost layer of the bundle of sheets in the sheet feed cassette 21.

The image forming unit 30 performs image forming operation in which it forms a toner image (developer image) on a sheet fed out from the sheet feeding unit 20. The image forming unit 30 includes a photosensitive drum 31, and includes, disposed around the photosensitive drum 31, a charging unit 32, an exposure unit 35, a developing unit 33, and a transfer roller 34.

The photosensitive drum 31 (image carrying member) has a rotary shaft and an outer circumferential surface (drum body) that rotates about the rotary shaft. On the outer circumferential surface of the photosensitive drum 31, a photosensitive layer is formed that is formed of a known organic photoconductive (OPC) material and composed of an electric charge generation layer, an electric charge conduction layer, and the like. The photosensitive layer is electrostatically charged uniformly by the charging unit 32 (described later), and is then exposed to light from the exposure unit 35 so that, through attenuation of electric charge, an electrostatic latent image is formed. After that, the electrostatic latent image is made visible by the developing unit 33 so that a toner image is carried on the photosensitive drum 31.

The charging unit 32 (charging device) is disposed at a predetermined distance from the outer circumferential surface of the photosensitive drum 31 and, while remaining out of contact with the outer circumferential surface of the photosensitive drum 31, electrostatically charges it uniformly. Specifically, the charging unit 32 includes a charge wire and a grid electrode (neither is shown). The charging unit 32 passes an electric current of a predetermined current value across the charge wire to cause corona discharge, and applies a predetermined voltage to the grid electrode. The charging unit 32 thereby electrostatically charges the outer circumferential surface of the photosensitive drum 31, which is disposed opposite the grid electrode, to a predetermined surface potential.

The exposure unit 35 (exposure device) includes a laser light source and optical devices such as a mirror and a lens. The exposure unit 35 irradiates the outer circumferential surface of the photosensitive drum 31 with light that is modulated according to image data fed from an external device such as a personal computer. Thus the exposure unit 35 forms on the outer circumferential surface of the photosensitive drum 31 the electrostatic latent image based on the image data.

The developing unit 33 (developing device) is mountable and dismountable with respect to the body housing 10. The developing unit 33 develops the electrostatic latent image formed on the outer circumferential surface of the photosensitive drum 31 by feeding non-magnetic one-component toner (developer) to the outer circumferential surface of the photosensitive drum 31. Developing an electrostatic latent image denotes forming a toner image (developer image) by making the electrostatic latent image visible.

The transfer roller 34 is a roller for transferring the toner image formed on the outer circumferential surface of the photosensitive drum 31 to a sheet. Specifically, the transfer roller 34 has an outer circumferential surface that rotates about an axis and that faces the outer circumferential surface of the photosensitive drum 31 at a position downstream of the developing unit 33 in the rotation direction of the photosensitive drum 31. The transfer roller 34 transfers the toner image carried on the outer circumferential surface of the photosensitive drum 31 to a sheet that passes through the nip between the transfer roller 34 and the outer circumferential surface of the photosensitive drum 31. During the transfer, the transfer roller 34 is fed with a transfer voltage of the polarity opposite to that of the toner.

The fixing unit 40 performs fixing operation in which it fixes to the sheet the toner image transferred to it. The fixing unit 40 includes a fixing roller 41 and a pressing roller 42. The fixing roller 41 incorporates a heat source, and heats the toner transferred to the sheet at a predetermined temperature. The pressing roller 42 is disposed in pressed contact with the fixing roller 41, and forms a fixing nip with the fixing roller 41. When the sheet having the toner image transferred to it is passed through the fixing nip, the toner image is heated by the fixing roller 41 and pressed by the pressing roller 42 to be fixed to the sheet.

Inside the body housing 10, there are provided, for sheet conveyance, a main conveyance passage 22F (sheet conveyance passage) and a reversal conveyance passage 22B. The main conveyance passage 22F extends from the sheet feeder 21A in the sheet feeding unit 20 via the image forming unit 30 and then the fixing unit 40 to a sheet discharge port 14 provided opposite the discharge tray 13 in the top face of the body housing 10. The reversal conveyance passage 22B is a conveyance passage through which, when duplex printing is performed, a sheet printed on one side is fed back to upstream of the image forming unit 30 in the main conveyance passage 22F.

The main conveyance passage 22F extends so as to pass through, from below to above, the transfer nip formed between the photosensitive drum 31 and the transfer roller 34. In the main conveyance passage 22F, upstream of the transfer nip, a pair of registration rollers 23 is disposed. A sheet is momentarily stopped at the pair of registration rollers 23 for correction of skew, and is then fed into the transfer nip with predetermined timing for image transfer. At appropriate places along the main conveyance passage 22F and the reversal conveyance passage 22B, a plurality of pairs of conveyance rollers are provided for sheet conveyance.

The reversal conveyance passage 22B is formed between the outer surface of a reversing unit 25 and the inner surface of the rear cover 12 of the body housing 10. On the inner surface of the reversing unit 25 are mounted the transfer roller 34 and one of the pair of registration rollers 23. The rear cover 12 and the reversing unit 25 are individually pivotable circumferentially about a pivot portion 121 provided at their lower end. In the event of a jam (clogging with a sheet) in the reversal conveyance passage 22B, the rear cover 12 is opened. In the event of a jam in the main conveyance passage 22F, or when the unit including the photosensitive drum 31 or the developing unit 33 is dismounted, the rear cover 12 and also the reversing unit 25 are opened.

Near the sheet discharge port 14, there are disposed a pair of discharge rollers 24 (sheet discharge unit), sheet pressing members 50, and a conveyance guide 63. The pair of discharge rollers 24 discharges sheets through the sheet discharge port 14 onto the discharge tray 13. A pair of sheet pressing members 50 are provided at the left and right sides, respectively, of the sheet discharge port 14 (see FIG. 1), and presses left and right end parts of the sheet where it is prone to curl. The conveyance guide 63 is attached to the reverse surface of a top cover 60 to form the top surface of the main conveyance passage 22F, and guides the sheet conveyed along the main conveyance passage 22F to the sheet discharge port 14.

Figure 3:
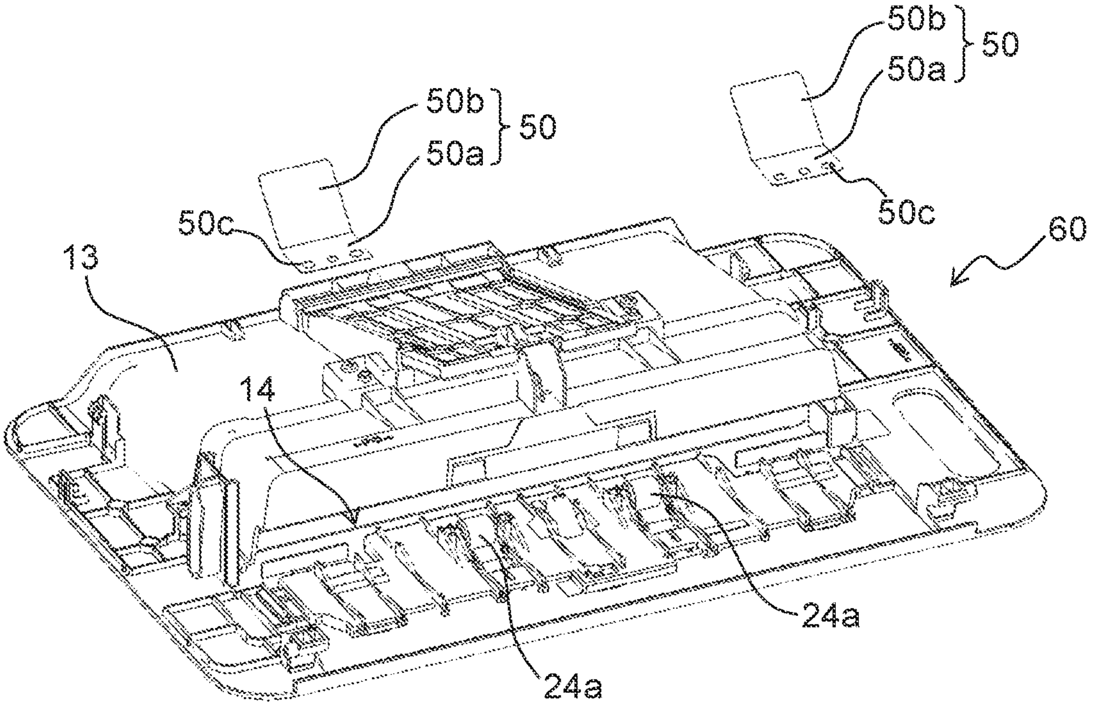
FIG. 3 is an exploded perspective view of a top cover and sheet pressing members fitted to it in the image forming apparatus according to the embodiment.

FIG. 3 is an exploded perspective view of the top cover 60 and the sheet pressing members 50 fitted to it in the image forming apparatus 1 according to the embodiment. The sheet pressing member 50 is formed of a single sheet material, and has a fastened portion 50*a* and a pressing portion 50*b*. The fastened portion 50*a* is fastened to the reverse surface of the top cover 60 forming an upper part of the sheet discharge port 14. The pressing portion 50*b* protrudes from the fastened portion 50*a* obliquely downward, toward the downstream side in the sheet discharge direction (rightward in FIG. 2). The pressing portions 50*b* make contact with and press downward the left and right end parts of the sheet discharged through the sheet discharge port 14. The fastened portion 50*a* has positioning holes 50*c* formed in it.

The sheet pressing member 50 may be formed of any flexible material such as a synthetic resin film, preferably a film with sufficient strength to reduce curls in a sheet. One suitable example is a film of polyethylene terephthalate (PET) (Lumirror® film). The sheet pressing member 50 may have any size and any thickness that can be determined to suit the dimensions of the sheet discharge port 14 and the size of the conveyed sheets. To be able to reduce curls in a sheet, however, the sheet pressing member 50 should have a certain degree of elastic force. Accordingly, when a PET film is used, it should preferably have a thickness of 0.1 mm or more.

When the sheet pressing member 50 is attached, first the fastened portion 50*a* of the sheet pressing member 50 is fastened to the reverse surface of the top cover 60. Specifically, the positioning holes 50*c* formed in the fastened portion 50*a* of the sheet pressing member 50 are fitted around positioning bosses (not shown) formed on the reverse surface of the top cover 60. In this state, the conveyance guide 63 (see FIGS. 2 and 4) is attached to the reverse surface of the top cover 60. This results in the fastened portion 50*a* to be fastened by being held between the top cover 60 and the conveyance guide 63. Then the top cover 60 with the sheet pressing member 50 and the conveyance guide 63 fitted to it is attached to the body housing 10.

Here, the sheet discharge port 14 is located at a position easily accessible to the user (where the user is likely to touch it), and this may lead to inadvertent deformation of the sheet pressing member 50. Specifically, the sheet pressing member 50 is flexible and elastically deforms to prevent excessive pressing of a sheet that makes contact with it. Being touched by the user may cause the sheet pressing member 50 to deform beyond the limit of elastic deformation (i.e., to deform plastically). To avoid that, in the embodiment, an edge, in the sheet discharge direction, of the top cover 60 forming the top surface of the sheet discharge port 14 is extended to form an overhang portion 61. Specifically, the overhang portion 61 is formed by extending an edge, in the sheet discharge direction, of the top cover 60 toward the downstream side from the upper edge 14*b* of the sheet discharge port 14, which is located opposite the lower edge 14*a* of the sheet discharge port 14. The overhang portion 61 has a bent portion 61*b* bent vertically downward from its distal end 61*a*.

As the dimension of the image forming apparatus 1 in its height direction is reduced, the distance between the photosensitive drum 31 and the sheet discharge port 14 shortens. This may lead to a layout where the external light that enters through the sheet discharge port 14 directly strikes the photosensitive drum 31. This can adversely affect the formation of the electrostatic latent image on the photosensitive drum 31 by the exposure unit 35 and lead to image defects.

Figure 4:
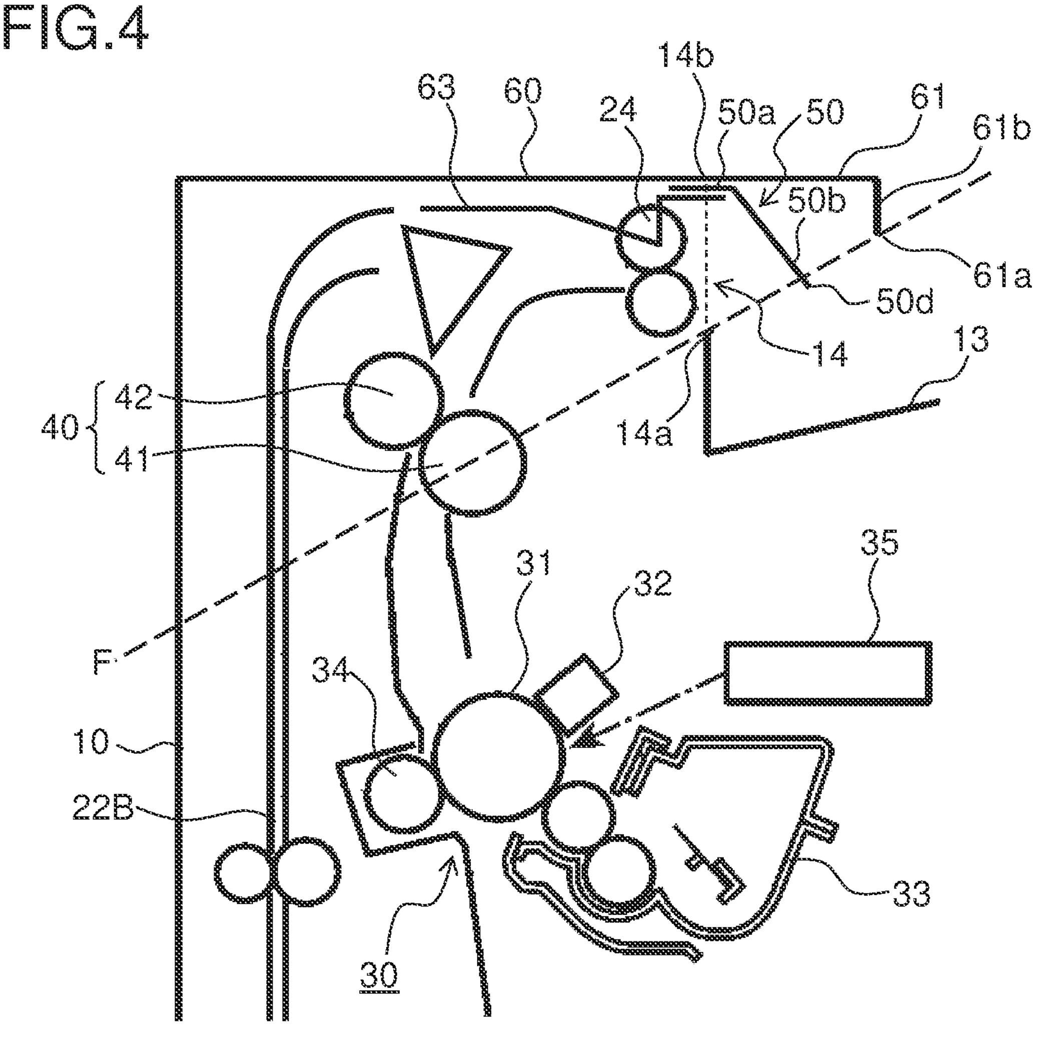
FIG. 4 is a sectional part view of the image forming apparatus, showing the relationship between the optical path of light entering through a sheet discharge port and a photosensitive drum.

FIG. 4 is a sectional part view of the image forming apparatus 1, showing the relationship between the optical path of the light entering through the sheet discharge port 14 and the photosensitive drum 31. Of the light that enters the body housing 10 through the sheet discharge port 14, the part that reaches lowest inside the body housing 10 has an optical path that is represented by a straight line F passing through the distal end 61*a* of the overhang portion 61 and the lower edge 14*a* of the sheet discharge port 14.

As shown in FIG. 4, in the image forming apparatus 1 according to the embodiment, the dimension by which the overhang portion 61 protrudes in the sheet discharge direction is defined such that the straight line F passes over the photosensitive drum 31. This results in a layout where the external light entering through the sheet discharge port 14 does not directly strike the photosensitive drum 31, and consequently the external light entering through the sheet discharge port 14 no longer adversely affect the formation of the electrostatic latent image on the photosensitive drum 31.

The distal end 61*a* of the overhang portion 61 protrudes toward the downstream side in the sheet discharge direction (rightward in FIG. 4) beyond a distal end part 50*d* of the sheet pressing member 50, without applying any external force to the sheet pressing member 50. Thus, when the sheets discharged on the discharge tray 13 are removed, owing to the overhang portion 61, the user is unlikely to touch the sheet pressing member 50, and this helps prevent deformation of the sheet pressing member 50. Moreover, owing to the overhang portion 61 having the bent portion 61*b* bent vertically downward from the distal end 61*a*, it is possible to reduce the inclination of the straight line F that passes through the distal end 61*a* of the overhang portion 61 and the lower edge 14*a* of the sheet discharge port 14 without increasing the dimension of the protrusion of the overhang portion 61 in the sheet discharge direction. It is thus possible, without spoiling the ease of removing the sheets discharged on the discharge tray 13, to effectively suppress exposure of the photosensitive drum 31 to the light entering through the sheet discharge port 14.

The embodiment described above is in no way meant to limit the scope of the present disclosure, and thus allows for many modifications without departure from the spirit of what is disclosed herein. For example, while in the above embodiment the sheet pressing member 50 is fastened by being held between the top cover 60 and the conveyance guide 63, this is not meant to limit how the sheet pressing member 50 should be fastened; it may instead be fastened with double-sided adhesion tape, adhesive, screws, or the like.

While the above embodiment deals with a monochrome printer as an example of an image forming apparatus 1, the present disclosure is applicable equally to tandem-type color printers, and to image forming apparatuses such as copiers and facsimile machines, as well as multifunction peripherals incorporating their functions.

The present disclosure finds applications in image forming apparatuses provided with a sheet discharge port through which sheets having images formed on them are discharged onto a discharge tray. Based on the present disclosure, it is possible to provide image forming apparatuses that can prevent deformation of a sheet pressing member provided in a sheet discharge port and that can also prevent exposure of an image carrying member to external light entering through the sheet discharge port.

What is claimed is:

1. An image forming apparatus comprising:

a sheet conveyance passage through which a sheet is conveyed;

an image forming unit including an image carrying member having a photosensitive layer formed on a surface thereof, the image forming unit electrophotographically forming an image on the sheet conveyed by the sheet conveyance unit;

a sheet discharge unit disposed above the image forming unit, the sheet discharge unit discharging the sheet having the image formed thereon in the image forming unit;

an apparatus body including the sheet conveyance passage, the image forming unit, and the sheet discharge unit therein;

a sheet discharge port provided in the sheet discharge unit in the apparatus body, the sheet discharge port having an upper edge and a lower edge extending in a width direction orthogonal to a sheet conveyance direction;

a pair of sheet pressing members provided at both ends of the sheet discharge port in the sheet width direction so as to extend obliquely downward, toward a downstream side in a sheet discharge direction, the pair of sheet pressing members pressing both ends of the sheet passing through the sheet discharge port;

a discharge tray which is formed in a top face of the apparatus body and which stacks the sheet discharged through the sheet discharge port; and an overhang portion protruding from the upper edge of the sheet discharge port in the sheet discharge direction beyond the lower edge of the sheet discharge port, wherein the image carrying member is disposed downstream of the sheet discharge port with respect a direction from which light enters through the sheet discharge port, the overhang portion is disposed such that a straight line passing through a distal end of the overhang portion and the lower edge of the sheet discharge port passes above the image carrying member inside the apparatus body, wherein the pair of sheet pressing members each have a fastened portion fastened to a reverse surface of the top cover and a pressing portion bent from the fastened portion and protruding obliquely downward, toward the downstream side in the sheet discharge direction, and a conveyance guide that constitutes a top surface of the sheet conveyance passage can be attached to the reverse surface of the top cover and the pair of sheet pressing members are fastened to the top cover as a result of, when the conveyance guide is attached, the fastened portions fitted on the reverse surface of the top cover being held between the top cover and the conveyance guide.

2. The image forming apparatus according to claim 1, further comprising:

a top cover provided on the apparatus body and constituting an upper part of the sheet discharge port, wherein the overhang portion is provided by extending an edge of the top cover in the sheet discharge direction.

3. The image forming apparatus according to claim 1, wherein the overhang portion has a bent portion bent vertically downward from the distal end thereof.

4. The image forming apparatus according to claim 1, wherein the distal end of the overhang portion protrudes toward the downstream side in the sheet discharge direction beyond distal ends of the pair of sheet pressing members, without applying any external force to the pair of sheet pressing members.

5. The image forming apparatus according to claim 4, wherein the pair of sheet pressing members are formed of a flexible film.

6. The image forming apparatus according to claim 1, wherein the sheet pressing members have positioning holes formed in the fastened portion thereof, and the positioning holes are fitted around positioning bosses formed on the reverse surface of the top cover.

* * * * *